L. A. JENES AND J. W. CLEMENT.
SIGNALING ATTACHMENT TO TRAINS.
APPLICATION FILED JUNE 23, 1917.
1,302,804.
Patented May 6, 1919.
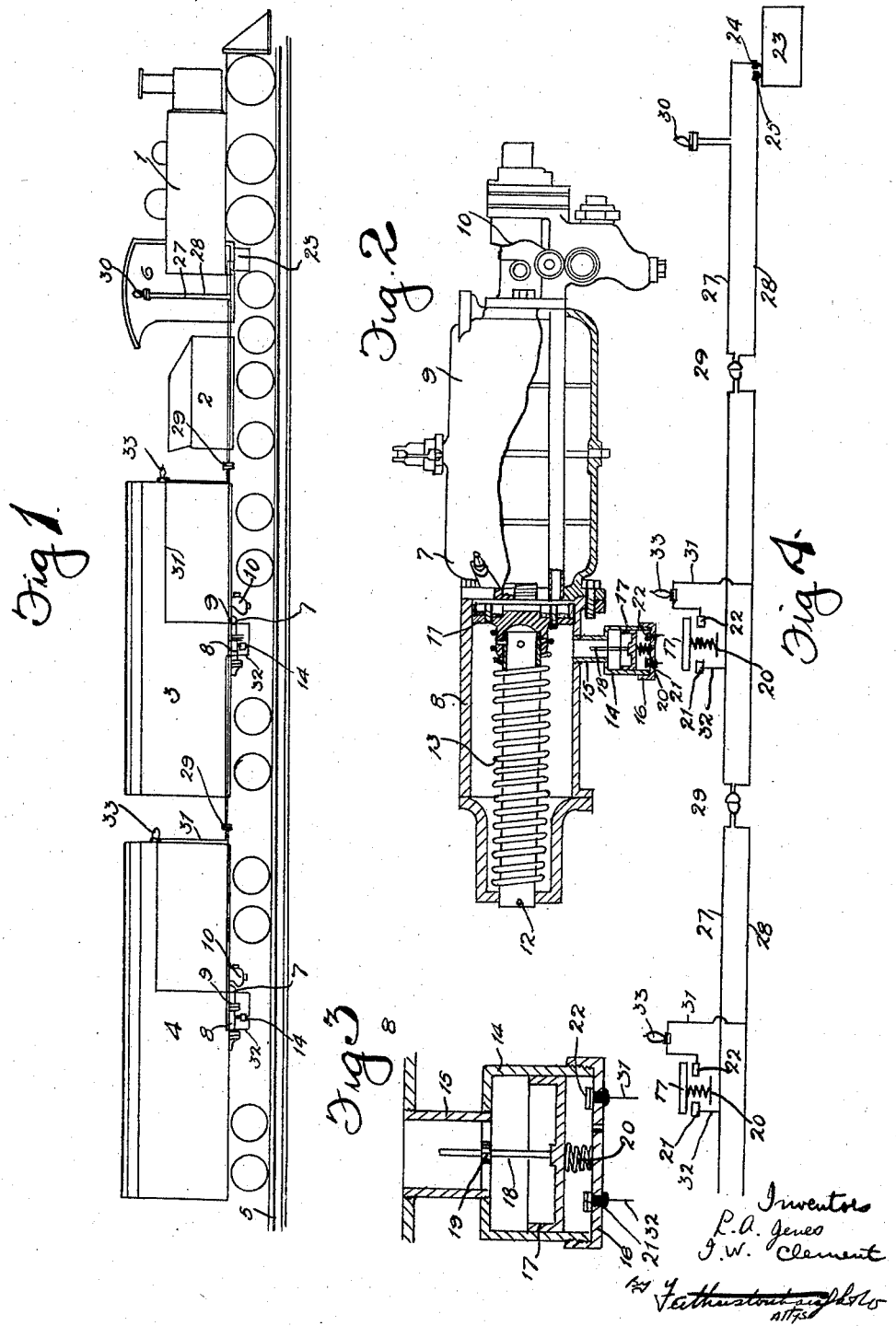

UNITED STATES PATENT OFFICE.

LEE A. JENES AND JOHN W. CLEMENT, OF WINNIPEG, MANITOBA, CANADA.

SIGNALING ATTACHMENT TO TRAINS.

1,302,804. Specification of Letters Patent. Patented May 6, 1919.

Application filed June 23, 1917. Serial No. 176,582.

*To all whom it may concern:*

Be it known that we, LEE A. JENES and JOHN W. CLEMENT, of the city of Winnipeg, in the Province of Manitoba, Canada, have invented certain new and useful Improvements in Signaling Attachments to Trains, of which the following is a specification.

The invention relates to signaling attachments to trains and the object of the invention is to provide a signaling means as part of a train equipment which will operate in conjunction with the air brake system to indicate to the engineer in the engine cab whether the air brakes are operating properly or not and if not will signal him, and besides signaling the engineer will indicate by way of a signal on what car or cars the brakes are not working properly and by so doing permit the brakeman to readily locate the brakes not responding.

With the above object in view the invention consists essentially in the arrangement and construction of parts hereinafter described and later pointed out in the appended claims, reference being had to the accompanying drawing in which:—

Figure 1 represents a train equipped with our invention.

Fig. 2 represents an enlarged detailed vertical sectional view of a freight car brake, cylinder and air reservoir with our signaling cylinder applied.

Fig. 3 represents an enlarged detailed vertical sectional view through the signaling cylinder.

Fig. 4 represents diagrammatically the electric circuit.

In the drawing like characters of reference indicate corresponding parts in the several figures.

In the present instance we have shown a train as composed of the engine 1, coal car or tender 2, and two freight cars 3 and 4 which are all coupled together in the usual way and are operating on the tracks 5.

The engine cab is indicated by the reference numeral 6.

As is customary each of the cars is supplied with a car brake 7 which brakes are of usual construction and are utilized to effect under the action of compressed air, the braking of the car wheels.

We have not considered it necessary to show how these air brakes work to set or release the brakes as this is ordinary equipment and forms no part of our invention. The brake itself however has been shown in detail and it comprises a brake cylinder 8, an air reservoir 9, a triple valve 10, a piston or plunger 11 operatively mounted in the cylinder, a guide stem 12 for the plunger and a coiled spring 13 mounted on the stem and arranged to normally hold the piston in the position shown in Fig. 2 of the drawing.

This brake and its connection are such that when it is operated by the engineer in the cab in the ordinary way, the plunger goes back under the action of compressed air admitted from the reservoir and against the action of the spring to set the brakes and when released the plunger resets or returns to the position shown in Fig. 2 and releases the brakes.

In applying our invention we attach to the cylinder of the brake of each car a signaling cylinder and connect the signaling cylinders in a suitably arranged electric circuit in a manner such that if any of the brake cylinders fail to operate properly in releasing the brakes the engineer will be signaled and a signal will be made on the car having the improperly working brake.

Referring now particularly to Figs. 2 and 3, 14 represents a signaling cylinder connected in any suitable way such as by a nipple 15 to the brake cylinder and having the lower end thereof closed by a cap 16.

Within the signaling cylinder we locate a piston or plunger 17 mounted for reciprocating movement and supplied with an upwardly extending stem 18 which is suitably guided in a spider 19 located in the nipple.

Between the underface of the piston and the cap we locate a coiled spring 20 which operates to hold the piston in a normal up position.

The cap carries a pair of contact tips 21 and 22 which are suitably insulated from the cap and are adapted in the depression of the piston to engage therewith and make connection one with the other through the piston.

It is to be understood that each car brake cylinder is supplied with one of these signaling cylinders with fittings, its position being approximately in the location shown in Fig. 2 of the drawing.

In any suitable location, such as on the engine, we locate a storage battery 23 or other source of electro-motive force of which 24 and 25 are the terminals. From these terminals we pass two feed wires 27 and 28 which pass full length of the train and are supplied intermediately of the cars of the train with any suitable form of separable plug indicated at 29 which allows the circuit to be readily broken when the cars are to be disconnected or uncoupled.

In the cab and in one of the feed wires we locate an electric light 30 or any other suitable form of electric signaling appliance and on each of the cars we connect one of the contact tips with one of the feed wires by a supply wire 31 and the other of the contact tips with the other of the feed wires by the supply wire 32.

In each of the supply wires 31 we insert an electric lamp 33 or other suitable electrical signaling appliance.

Obviously upon the depression of the pistons 17 to contact with the contacts 21 and 22 the lamps 33 will be illuminated provided the circuit is otherwise closed as they are then connected across the feed wires.

As a matter of convenience we have located the lamps 33 at the ends of the cars so that they can be readily seen by a passing brakeman.

With this device installed the action is as follows:—

Assuming that the air brakes have been set to stop the train, have been released prior to starting the same and one of them has failed to operate, that is to say, one brake has not released, then under such a condition, in the ordinary case without our appliance, the engineer in starting his train would be dragging a car with a brake set and would not have any indication of it.

With our appliance as soon as the brakes are put on the compressed air admitted to the cylinders forces the plungers 11 back and by so doing gains admission to the cylinders 14 and effects in them the down movement of the plungers 17 and the electrical connection through the plungers 17 of the contact tips. This movement lights all the lamps by closing the circuit at the various cars.

Upon the engineer releasing the air from the air brakes all of the plungers 11 will under normal conditions return to their initial position as will also the plunger 17 and accordingly all the lights will go out.

However, should any one of the brakes fail to respond when releasing there will be compressed air in the particular cylinder 8, which is not working, with the result that the plunger of the signaling cylinder of that particular brake cylinder will be making contact with the tips and by so doing will be effecting the closing of the circuit through the wires 31 and 32 of that particular car. Consequently the light in the engineer's cab remains lighted after the brakes have been released and the lamp on the particular car on which the brakes are failing to operate remains lighted.

In this way the engineer is signaled before he starts his engine and he can send a brakeman to attend to the non-working brake, the brakeman readily finding the brake by watching for the illuminated light on the car.

From observing the drawing it will be obvious that if several brakes fail to operate in a train of cars the signaling light in the cab will be lighted as will also the lamps on each car having a non-operating brake.

Although we have described this invention in detail still it will be understood we do not wish to be restricted to the precise constructions shown as these could be readily modified without in the least departing from the spirit of the invention as covered by the appended claims.

What we claim as our invention is:—

1. In a signaling appliance for a train of cars having an air brake system including air cylinders, the combination with the air brake system, of a signaling cylinder communicating with each of the air cylinders of the air brake system, a piston operatively mounted in each of the signaling cylinders and directly under the influence of the compressed air admitted to the brake cylinders in the setting of the brakes, insulated contact tips associated with each of the signaling cylinders and adapted to be electrically connected by contact with the pistons, and an electric circuit extending throughout the train containing a signaling means for the engineer and a source of electro-motive-force and adapted to be closed by the contacting of the pistons with the contact tips.

2. In a signaling appliance for a train of cars having an air brake system including air cylinders, the combination with the air brake system of a signaling cylinder communicating with each of the air cylinders of the air brake system, a piston operatively mounted in each of the signaling cylinders and directly under the influence of the compressed air admitted to the brake cylinders in the setting of the brakes, insulated contact tips associated with each of the signaling cylinders and adapted to be electrically connected by contact with the pistons, an electric circuit extending throughout the train containing a signaling means for the engineer, a signaling means on each car of the train of cars, and a source of electro-motive-force, such circuit being arranged in a manner such that the contacting of the pistons with the contact tips effects the controlling of the signaling means throughout.

3. In a signaling appliance for a train of cars having an air brake system, the combination with the air brake system including air cylinders, of a signaling cylinder communicating with each of the air cylinders of the air brake system, a piston operatively mounted in each of the signaling cylinders and directly under the influence of the compressed air admitted to the brake cylinders in the setting of the brakes, insulated contact tips associated with each of the signaling cylinders and adapted to be electrically connected by contact with the pistons, and an electric circuit extending throughout the train and comprising an electric lamp on each car and a source of electro-motive-force, all of said lamps being arranged in the circuit in a manner such that upon the pistons contacting the lamps will be lighted.

Signed at Winnipeg, this 8th day of June, 1917.

LEE A. JENES.
JOHN W. CLEMENT.

In the presence of—
G. S. BOXBURGH,
ROLAND FOSTER.

Copies of this patent may be obtained for five cents each, by addressing the "Commissioner of Patents, Washington, D. C."